US00RE39873E

(19) United States
(12) Reissued Patent
Kim

(10) Patent Number: US RE39,873 E
(45) Date of Reissued Patent: Oct. 9, 2007

(54) APPARATUS AND METHOD FOR CONTROLLING PICTURE INVERSION OF A LIQUID CRYSTAL DISPLAY

(75) Inventor: Je-Tae Kim, Yongin-shi (KR)

(73) Assignee: LG Electronics, Inc., Seoul (KR)

(21) Appl. No.: 09/953,622

(22) Filed: Sep. 20, 2001

Related U.S. Patent Documents

Reissue of:
(64) Patent No.: 6,037,931
Issued: Mar. 14, 2000
Appl. No.: 08/953,413
Filed: Oct. 17, 1997

(30) Foreign Application Priority Data

Oct. 18, 1996 (KR) ..... 96-46900

(51) Int. Cl.
*G09G 5/00* (2006.01)

(52) U.S. Cl. ..... 345/204

(58) Field of Classification Search ..... 345/87, 345/89, 174, 204; 235/454
See application file for complete search history.

(56) References Cited

U.S. PATENT DOCUMENTS

| | | | | |
|---|---|---|---|---|
| 4,639,720 | A | 1/1987 | Rympalski et al. | 340/712 |
| 4,795,239 | A | 1/1989 | Yamashita et al. | 350/333 |
| 5,155,477 | A | 10/1992 | Shirochi | 340/784 |
| 5,656,802 | A | 8/1997 | Aoki | 235/454 |

*Primary Examiner*—Bipin Shalwala
*Assistant Examiner*—Jeff Piziali
(74) *Attorney, Agent, or Firm*—Finnegan, Henderson, Farabow, Garrett & Dunner, L.L.P.

(57) ABSTRACT

An apparatus and related method for controlling picture inversion of an LCD, determining states of vertical and horizontal sync signals. The determined states are used to insert appropriate delay periods so as to allow picture inversion to take place only when the video signal is in a section of displaying no image, thereby eliminating a noise bar that is displayed during the picture inversion operation.

2 Claims, 6 Drawing Sheets

APPARATUS AND METHOD FOR CONTROLLING PICTURE INVERSION OF A LIQUID CRYSTAL DISPLAY

Matter enclosed in heavy brackets [ ] appears in the original patent but forms no part of this reissue specification; matter printed in italics indicates the additions made by reissue.

BACKGROUND OF THE INVENTION

A. Field of the Invention

The present invention relates to an apparatus and method for controlling picture inversion of a liquid crystal display (hereinafter referred to as "LCD").

B. Description of the Prior Art

A conventional LCD includes, as shown in FIG. 1, a video processor 1 for processing an externally-supplied signal to provide a mixed video signal, and a signal processor 2 for receiving the mixed video signal from video processor 1 to provide a composite sync signal with a vertical sync signal and a horizontal sync signal and a signal without the sync signals. In addition, a sync signal generator 3 receives the composite sync signal from signal processor 2 and a control signal from a controller 5 to provide another new sync signal by means of a sync signal supplied from an internal sync signal generating device, and controller 5 provides control signals to sync signal generator 3 and an LCD part 6 responsive to a key signal supplied from a key input part 4. Also, LCD part 6 receives R, G, B video signal from signal processor 2 and the sync signal from sync signal generator 3 to display an image in accordance with the control signal from controller 5.

In the conventional LCD formed as described above, as shown in FIG. 1, once the externally-supplied signal is received into video processor 1 to provide the mixed video signal, signal processor 2 receives the mixed video signal from video processor 1 to separate the composite sync signal having the vertical sync signal and horizontal sync signal and supply it to sync signal generator 3 while supplying the other composite sync signal to LCD part 6.

At this time, sync signal generator 3 receives the composite sync signal supplied from signal processor 2 to supply the new sync signal to signal processor 2 and LCD part 6 in accordance with the control signal from controller 5. Simultaneously, the sync signal generator 3 supplies the control signal to LCD part 6.

When the new sync signal supplied from sync signal generator 3 is received into signal processor 2, signal processor 2 synchronizes the R, G, B signal with the new sync signal from sync signal generator 3 to supply the resultant signal to LCD part 6.

After the R, G, B signal from signal processor 2 and various control signals from sync signal generator 3 are supplied to LCD part 6 in the foregoing manner, the normal image is displayed on LCD part 6 in accordance with the control signal from controller 5.

If a picture inversion signal is provided from key input part 4 while the normal image is displayed on LCD part 6, controller 5 receives the picture inversion signal from key input part 4 to supply it to sync signal generator 3. Following this, sync signal generator 3 changes the control signal to correspond to the picture inversion in accordance with the received picture inversion signal to supply the changed signal to LCD part 6. By this operation, LCD part 6 inverts the currently-displayed image in accordance with the picture inversion control signal supplied from controller 5.

FIG. 2 shows timing charts of respective signals in the conventional LCD. Referring to FIG. 2, (a) shows vertical sync signals; (b) horizontal sync signals; (c) picture inversion signal; and (d) picture inversion control signal.

In other words, if the picture inversion signal (c), as shown in FIG. 2, is provided from key input part 4 when the mixed video signal supplied form video processor 1 includes the vertical sync signal (a) and horizontal sync signal (b), controller 5 receives the picture inversion signal (c) during a prescribed time period $\Delta t1$ and provides the picture inversion control signal (d) within a prescribed time period $\Delta t2$.

FIG. 3 illustrates pixels in the vertical axis and horizontal sync signals of the LCD. In case of the NTSC, the image is displayed such that the actually-displayed video signals on LCD part 6 are the 15th horizontal to the 248th horizontal sync signal when the vertical axis pixels number approximately 234. The image is not displayed on LCD part 6 at the horizontal sync signals in the sections H1 to H14 and H248 to H263.

The picture inversion is attained when the picture inversion signal is received into the displayed image in case that the time (obtained by $\Delta t1+\Delta t2$ from the vertical sync signal) taken for providing the picture inversion control signal from controller 5 in response to the picture inversion signal from key input part 4 exists within the section from H15 to H248. However, an arbitrary signal, one other than the original video signal, is displayed on the LCD part during the time (of approximately 2H to 5H) for executing the picture inversion. Thus, the conventional LCD heretofore has a problem of producing a severe noise on the LCD part.

SUMMARY OF THE INVENTION

Therefore, it is an object of the present invention to provide an apparatus and method for controlling picture inversion of an LCD, to eliminate a noise generated on the LCD part during the picture inversion operator.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises a signal detector for detecting a sync signal from a video signal and a controller for providing a picture inversion control signal to selectively allow the video signal to invertedly display based on the result of the detection of the signal detector and based on a picture inversion input.

In another aspect, the invention includes a method for controlling picture inversion of a liquid crystal display which comprises detecting a sync signal from a video signal in response to a picture inversion input, determining whether video image is displayed on the liquid crystal display or not, and selectively controlling a picture inversion operation in accordance with the result of the detection and determination.

It is to be understood that both the foregoing general description and the following detailed description are exemplary and explanatory and are not restrictive of the invention, as claimed.

The accompanying drawings, which are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
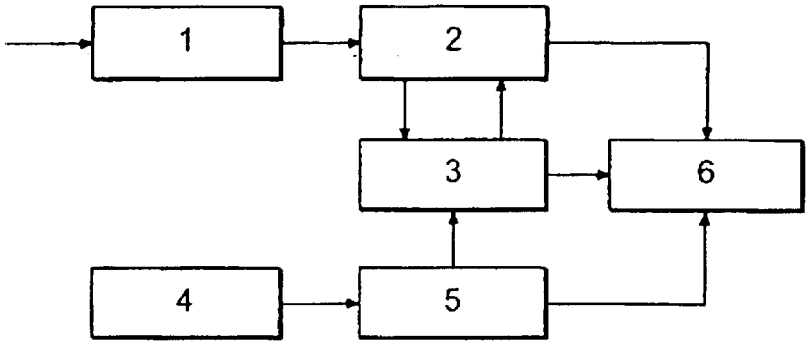
FIG. 1 (PRIOR ART)
FIG. 1 is a block diagram showing a structure of a conventional LCD.
Figure 3:
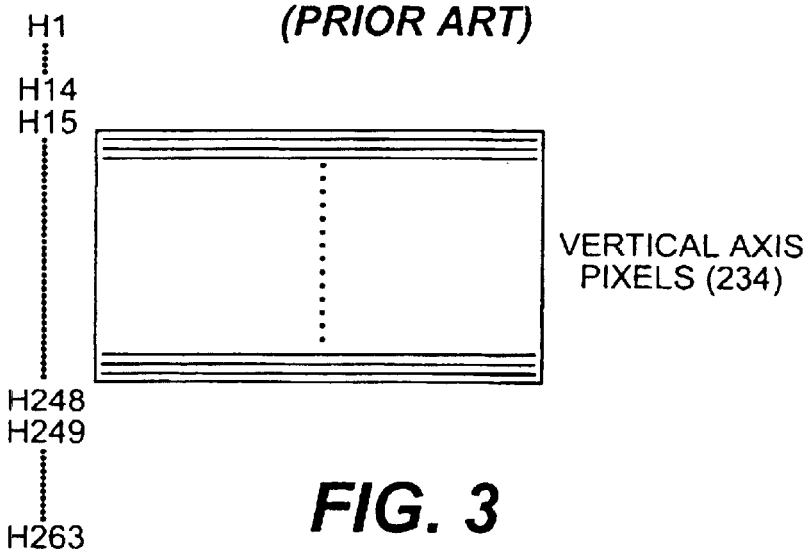
FIG. 3 is a view showing a relation between vertical axis pixels and horizontal sync signals of an LCD.
Figure 4:
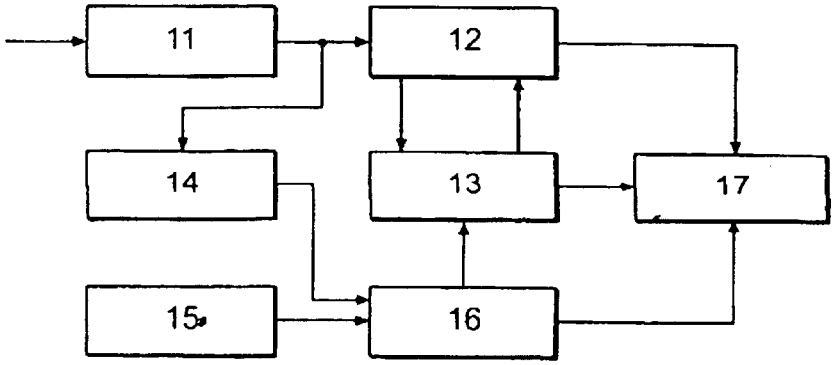
FIG. 4 is a block diagram showing an apparatus for controlling picture inversion of an LCD according to an embodiment of the present invention.
Figure 2:
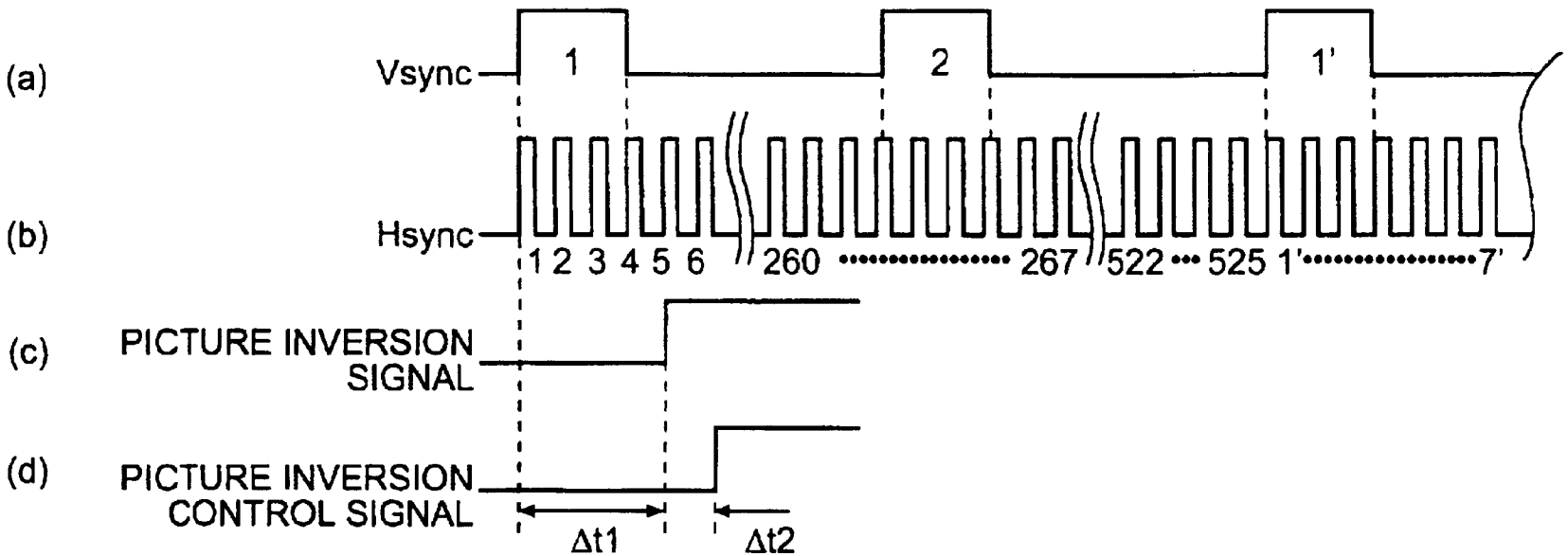
FIG. 2 (PRIOR ART)
FIG. 2 shows timing charts of respective signals in the conventional LCD.

To begin with, an apparatus for controlling picture inversion of an LCD according to the present invention, as shown in FIG. 4, includes a video processor 11 for processing an externally-supplied signal to provide a mixed video signal, and a signal processor 12 for receiving the mixed video signal from video processor 11 to provide a composite sync signal having a vertical sync signal and a horizontal sync signal and a signal having no sync signals. Also, a sync signal generator 13 receives the composite sync signal supplied from signal processor 12 and a control signal from a controller 16 to provide a new sync signal. A sync signal detector 14 detects the vertical sync signal and horizontal sync signal from the mixed video signal output from video processor 11 to count the vertical sync signals by "1" and "2" and horizontal sections from H1 to H525 in terms of the horizontal sync signal, thereby providing the result to controller 16. Here, controller 16 receives the vertical sync signal and horizontal sync signal form sync signal detector 14 and receives a picture inversion signal from a key input part 15 for providing a picture inversion control signal to invertedly display a video signal for liquid crystal by determining a section without involving the video signal for liquid crystal. Additionally, LCD part 17 displays the image in accordance with the control signal from controller 16 when the R, G, B signal from signal processor 12 and control signal from sync signal generator 13 are supplied thereto.

Hereinbelow, an operation of the present invention constructed as above will be described in detail with reference to FIG. 4.

Video processor 11 receives the externally-supplied signal to provide the mixed video signal to signal processor 12 and sync signal detector 14. Signal processor 12 receives the mixed video signal from video processor 11 to separate the composite sync signal into the vertical sync signal and horizontal sync signal and another composite signal without the sync signals, thereby providing the composite signal with the sync signals to sync signal generator 13 and providing the composite signal without the sync signals to LCD part 17.

At this time, sync signal generator 13 receives the composite sync signal form signal processor 12 to supply the new sync signal to signal processor 12 in accordance with the sync signal supplied from the internal sync signal generating device by means of the control signal from controller 16. At the same time, the control signal required in LCD part 17 is supplied to LCD part 17 from sync signal generator 13.

Upon the receipt of new sync signal into signal processor 12 from sync signal generator 13, signal processor 12 synchronizes the R, G, B signal with the new sync signal from sync signal generator 13 to supply the resultant signal to LCD part 17.

When the R, G, B sync signal from signal processor 12 and various control signals from sync signal generator 13 are received into LCD part 17, the normal image is displayed on LCD part 17 by means of the control signal from controller 16.

When the normal pictorial image is displayed on LCD part 17, sync signal generator 14 receives the mixed video signal from video processor 11 to detect the vertical sync signal and horizontal sync, thereby providing the detected signals to controller 16.

Figure 5:
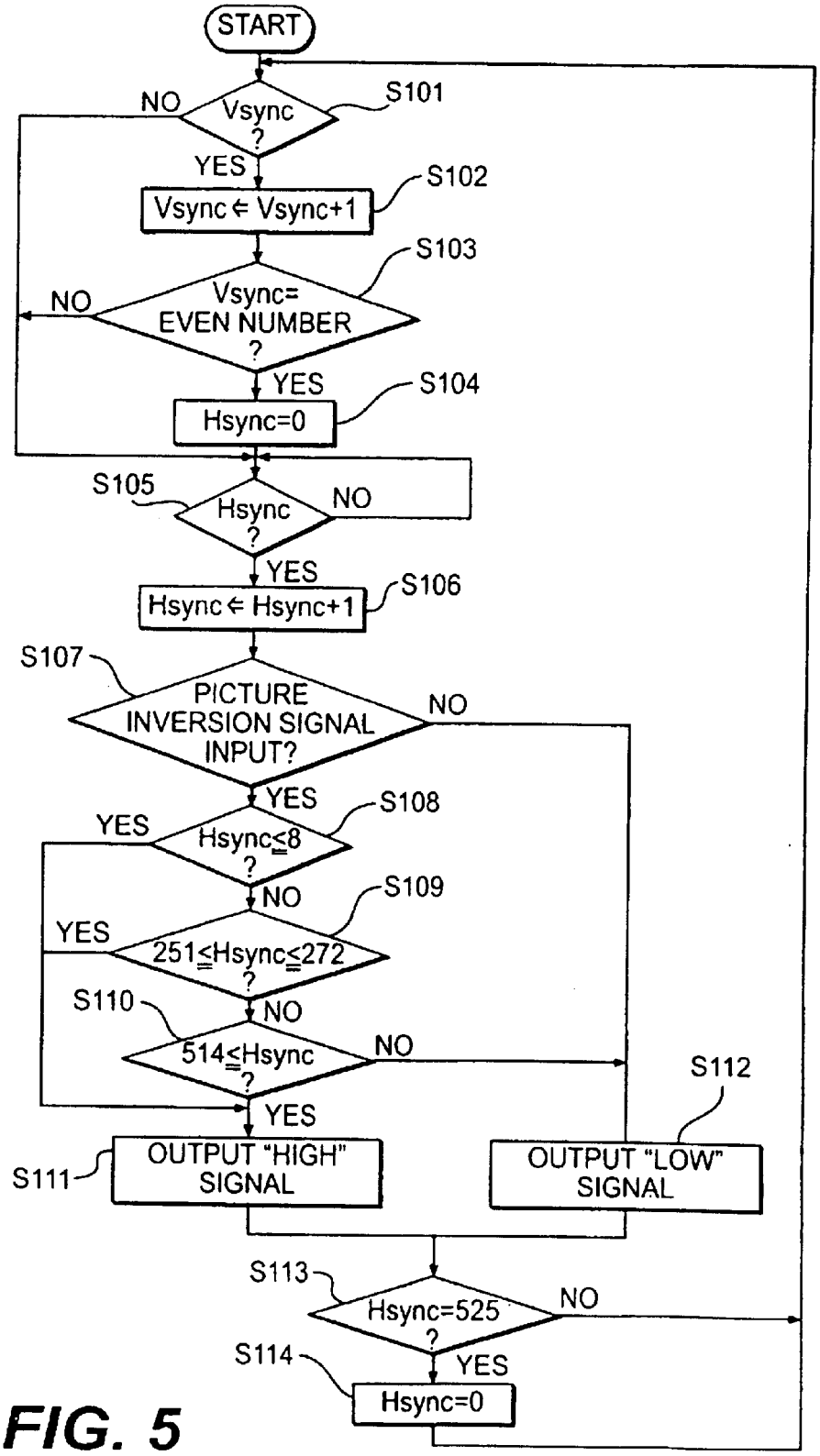
FIG. 5 is a flowchart showing a method for controlling picture inversion of the LCD according to an embodiment of the present invention.

A method for controlling picture inversion according to the present invention will now be described with reference to FIG. 5.

First, in step S101, signal processor 12 receives the mixed video signal from video processor 11 to judge whether the vertical sync signal as shown in FIG. 7A is indicated or not. When it is decided that the vertical sync signal is included, the program proceeds to step S102. Whereas, it proceeds to step S105 when it decides that no vertical sync signal is included.

Thereafter, in step S102, the new sync signal is provided by adding "1" to the current vertical sync signal. In step S103, it is judged whether the new vertical sync signal is of an even number or not. When the new vertical sync signal is decided as of the even number, it proceeds to step S104. Whereas, if the new vertical sync signal is of the odd number, it proceeds to step S105.

Then, in step S104, the horizontal sync signal is set to zero. In step S105, if the vertical sync signal is of the odd number or the composite sync signal includes no vertical sync signal, it is judged whether the horizontal sync signal is included or not. When it is decided that the horizontal sync signal is included, the program proceeds to step S106. If the horizontal sync signal is not included, step S105 is repeatedly performed until the horizontal sync signal is detected.

Figure 7:
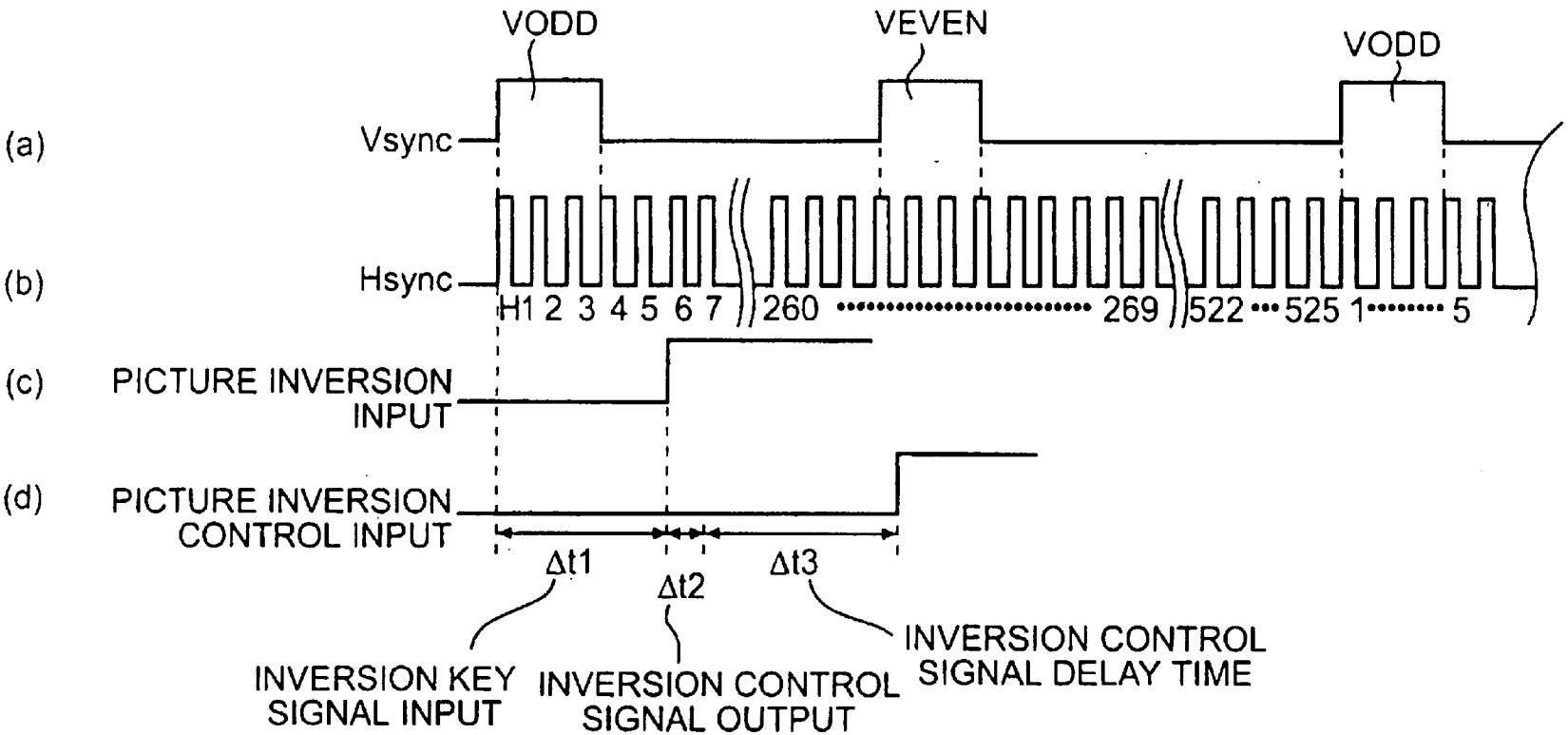
FIG. 7 shows timing charts of respective signals in the LCD according to an embodiment of the present invention.

In step S106, if the composite sync signal includes the horizontal sync signal (b), as shown in FIG. 7, the new horizontal sync signal is formed by adding "1" to the current horizontal sync signal to be supplied to controller 16.

After this, in step S107, it is judged whether the picture inversion signal (c), as shown in FIG. 7, is received from key input part 15, or not when the new horizontal sync signal is supplied into controller 16. When it is decided that the picture inversion signal is received, it proceeds to step S108. If not, it proceeds to step S112, thereby generating a "LOW"

picture inversion control signal and maintaining the normal pictorial image.

When the picture inversion signal is received, in step S108, it is determined whether the current horizontal sync signal is equal to or less than 8. If so, it proceeds to step S111, thereby generating a "HIGH" picture inversion control signal. If not, it proceeds to step S109.

Once it is determined that the horizontal sync signal is greater than 8, it is further determined whether the horizontal sync signal falls within the section from 251 to 272 in step S109. If so, it proceeds to step S111, thereby generating a "HIGH" picture inversion control signal. If not, it proceeds to step S110.

In step S110, it is determined whether the horizontal sync signal is greater than or equal to 514. If so, it proceeds to S111, thereby generating a "HIGH" picture inversion control signal. If not, it proceeds to step S112, thereby generating a "LOW" picture inversion control signal.

When the horizontal sync signal is less than or equal to 8, greater than or equal to 251 and less than or equal to 272, or greater than or equal to 514 in step S111, controller 16 provides a high signal which is the picture inversion control signal (d) (after elapsing a time period obtained by $\Delta t1+\Delta t2+\Delta t3$ from the vertical sync signal) as shown in FIG. 7 so as to execute the picture inversion on LCD part 17.

On the other hand, in step S112, when step S107 decides that there is no picture inversion signal input or the horizontal sync signal is less than 514 in step S110, controller 16 provide a low signal for maintaining the normal image on LCD part 17.

In step S113, sync signal detector 14 judges whether the section of the current horizontal sync signal is 525 or not. When the section of the current horizontal sync signal is decided as 525, it proceeds to step S114. If the section of the current horizontal sync signal is not 525, it proceeds to step S101 to repeatedly carry out the above-described steps.

In step S114, the section of the current horizontal sync signal is set to zero and the program is returned to step S101, thereby repeatedly carrying out the foregoing steps.

Figure 8:
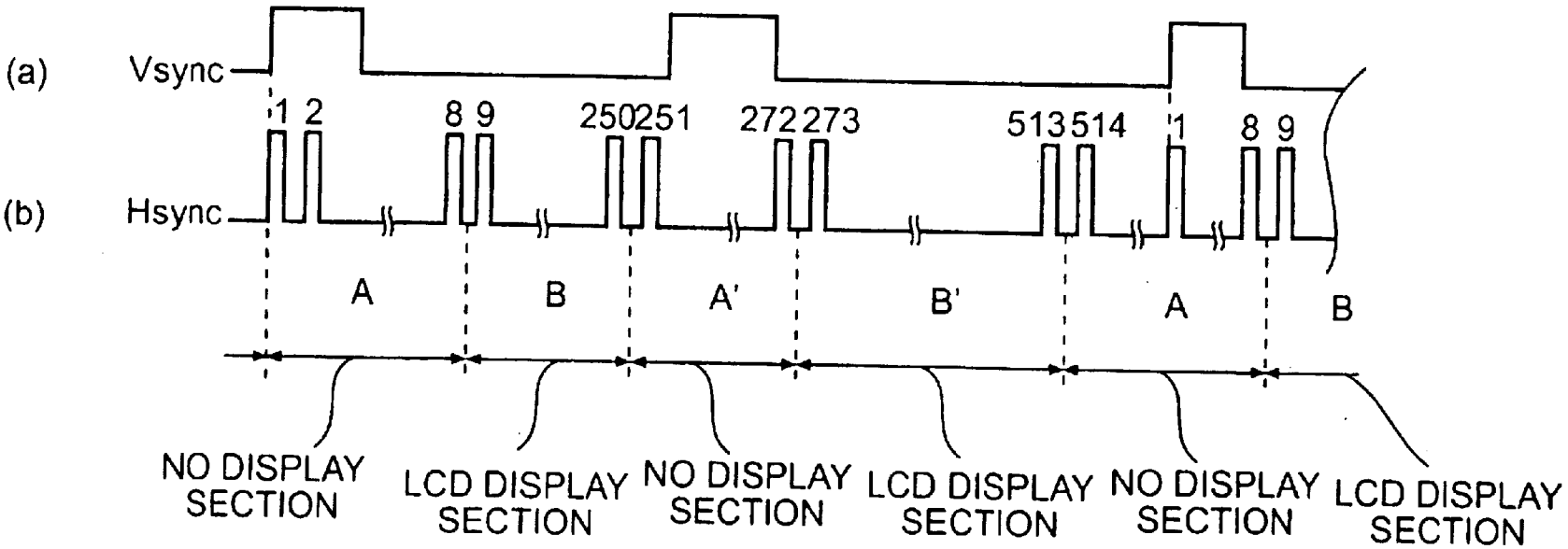
FIG. 8 shows waveforms respectively showing the sections of the vertical sync signal and horizontal signal on the LCD according to an embodiment of the present invention.

More specifically, once the picture inversion signal is supplied from key input part 15 when the normal pictorial image is displayed on LCD part 17, the picture inversion is performed with respect to the horizontal sync signal (b), as shown in FIG. 8, in the sections of 1 to 8, 251 to 272 and 514 to 525 while section 1 of the horizontal sync signal (b) is synchronized with the odd field of the vertical sync signal (a), as shown in FIG. 8. Thus, no noise is displayed on LCD part 17 during the picture inversion operation.

The sections of the horizontal sync signal and vertical sync signal and associated control time are described herein by assuming that the pixels of LCD numbering 234 in the vertical axis is used as a reference. When the pixel number in the vertical axis is changed into 240 or 480, adjustments can easily be made since there is a correlation with the 525 horizontal sync signals (625 for the PAL) within one period of the vertical sync signal of the video signal.

Figure 6:
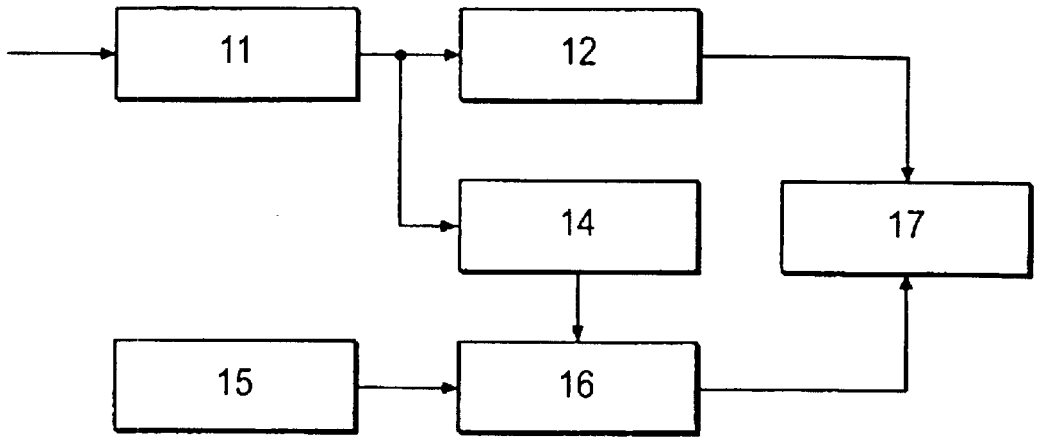
FIG. 6 shows another embodiment of the apparatus for controlling picture inversion of the LCD according to the present invention.

FIG. 6 shows another embodiment of the apparatus for controlling picture inversion of the LCD according to the present invention, which includes a video processor 11 for processing an externally-supplied signal to provide a mixed video signal. A signal processor 12 receives the mixed video signal from video processor 11 to provide a composite sync signal having a vertical sync signal and a horizontal sync signal and a signal having no sync signals. Also included as parts are a sync signal detector 14 for receiving the mixed video signal from video processor 11 to detect the vertical sync signal and horizontal sync signal, and a controller 16 for receiving the sync signals detected in sync signal detector to discriminate a section without involving a video signal for liquid crystal, thereby providing a control signal that allows the video signal for liquid crystal to be invertedly displayed in the section without involving the video signal for liquid crystal. Here, a reference numeral 15 denotes a key input part; and 17, an LCD part.

In describing the operation and effect of another embodiment of the apparatus for controlling picture inversion of the LCD according to the present invention formed as above, as shown in FIG. 6, once the externally-supplied signal is received into video processor 11 to provide the mixed video signal, signal processor 12 receives the mixed video signal from video processor 11. Then, signal processor 11 separates the composite sync signal having the vertical sync signal and horizontal sync signal to provide the video signal to LCD part 17.

At this time, sync signal detector 14 receives the mixed video signal to separately detect the sync signals and provide the detected signals to controller 16. Upon the receipt of the sync signals detected in sync signal detector 14, controller 16 determines the section without involving the video signal for liquid crystal to provide the picture inversion control signal so as to invertedly display the video signal for liquid crystal in the section without involving the video signal for liquid crystal. By doing so, the noise is not displayed when the picture of the video signal provided from signal processor 12 is invertedly displayed on LCD part 17 in accordance with the picture inversion control signal.

As described above, when the picture is inverted during displaying the image on the LCD part, the states of the vertical and horizontal sync signals are determined to provide no inversion control signal in the section of displaying the image on the LCD part but provide the inversion control signal in the section of displaying no image with the consequence of eliminating the noise displayed on the LCD part during the picture inversion operation. As the result, the apparatus and method for controlling the picture inversion according to the present invention are effective in enhancing reliability of the LCD.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for controlling picture inversion of a liquid crystal display, comprising:

a signal detector for detecting a sync signal from a video signal; and a controller for providing a picture inversion control signal to allow said video signal to be displayed invertedly at horizontal periods in which there is no *video image being displayed on said liquid crystal display based on a* result of comparing said detected sync signal with a reference value and based on a picture inversion input signal.

2. A method for controlling picture inversion of a liquid crystal display, comprising:

detecting a sync signal from a video signal in response to a picture inversion input signal;

comparing said detected sync signal with a reference value;

determining horizontal periods in which there is no video image being displayed on said liquid crystal display in accordance with said comparison result; and providing a picture inversion control signal in accordance with a result of said determination.

* * * * *